United States Patent Office 3,327,114
Patented June 20, 1967

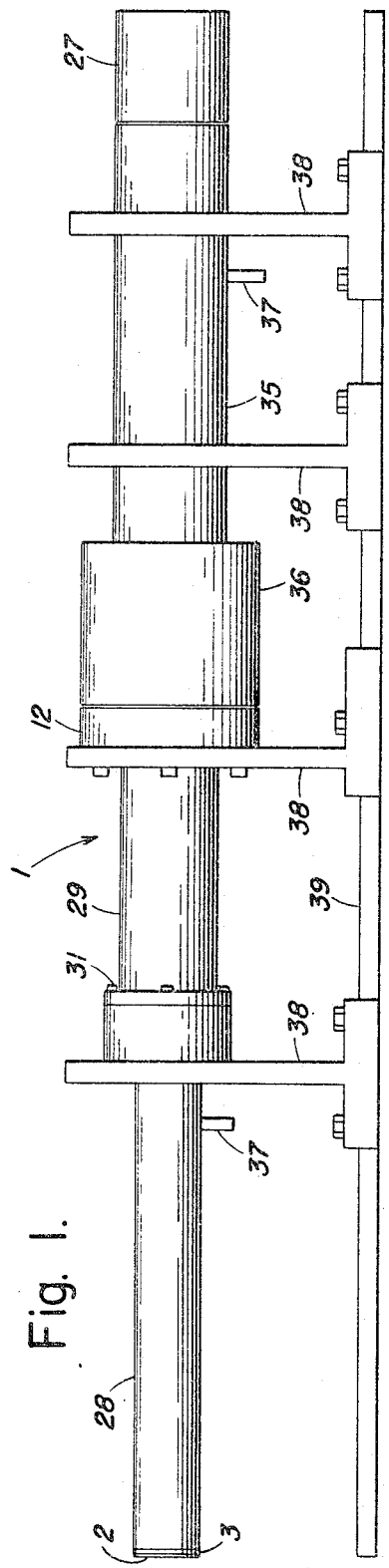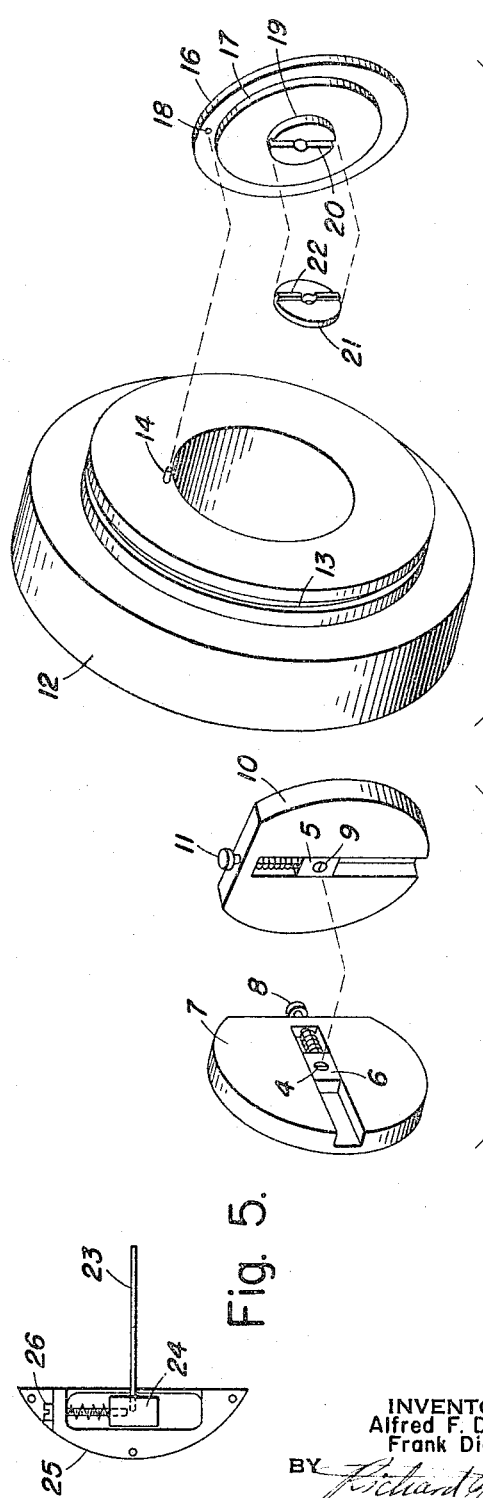

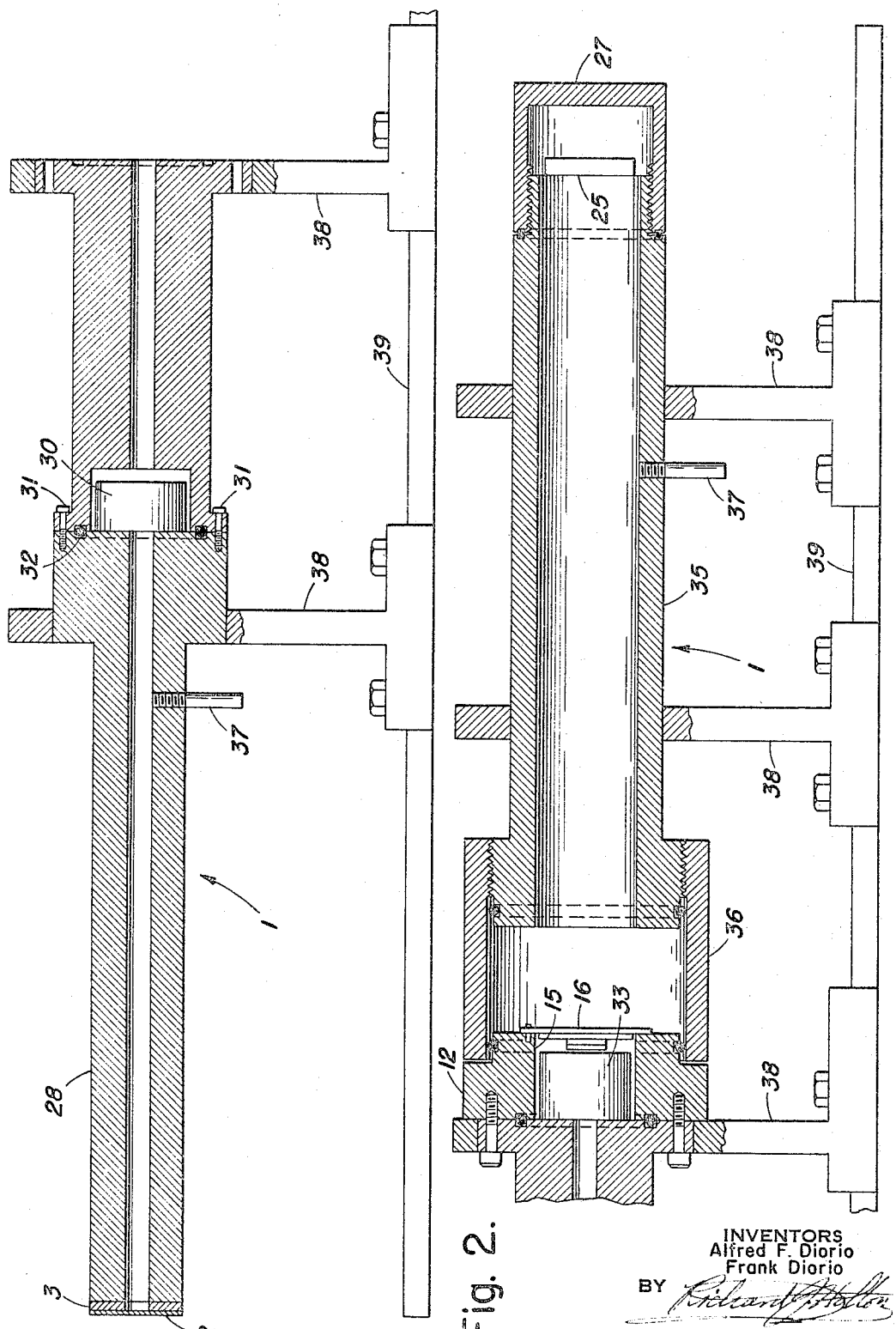

3,327,114
LOW-ANGLE X-RAY DIFFRACTION CAMERA COMPRISING RELEASABLY CONNECTED SECTIONS AND ADJUSTABLE BEAM APERTURES AND STOPS
Alfred F. Diorio, 6904 Strathmore St., Apt. 119, Chevy Chase, Md. 20015, and Frank Diorio, 8—59 Chester St., Fair Lawn, N.J. 07410
Filed June 23, 1964, Ser. No. 377,271
6 Claims. (Cl. 250—51.5)

This invention relates to apparatus for the investigation and measurement of electromagnetic wave energy diffraction and scattering effects. In particular, this invention relates to an X-ray diffraction camera or the like.

Many types of apparatus have been proposed for the investigation and measurement of diffraction effects and related phenomena displayed by various types of electromagnetic wave energy, particularly in the X-ray portion of the spectrum. Among these may be mentioned the X-ray diffractometer, transmission Laue camera, back-reflection Laue camera, Debye-Scherrer camera, Seeman-Bohlin focussing camera, Weissenberg camera, precession cameras, microcamera, etc.

In the investigation of the crystal structure of crystalline substances, and the macromolecular, crystalloidal structure of many others, it has been found that a great deal of useful information can be obtained by observing and measuring the manner in which they scatter an incident X-ray beam. Among materials with which this technique is particularly useful may be mentioned naturally-occurring polymeric substances such as proteins, cellulosic materials, rubber and the like, as well as similar or related synthetic materials, for example synthetic fibers.

In dealing with highly crystalline substances, such as a majority of inorganic polar compounds, the magnitude of the deflection of the X-ray beam is relatively quite large. Apparatus for measuring these large deflections has long been available and has been developed to a quite satisfactory degree. When dealing with materials of a lower order of crystallinity, on the other hand, such as proteins, organic fibers, viruses and the like, certain difficulties are encountered which render the conventional wide-angle equipment largely useless. One such difficulty arises by virtue of the fact that the angular deflection of the diffracted rays from the path of the incident X-ray beam is relatively very small (of the order of one degree or less). Because of this small angle, the sensing means, whether it be a photographic film, a pulse-counter, or other sensing means, is called upon to receive and measure a relatively weak signal in close proximity to a very strong signal. In order to avoid exceeding the inherent limitations of the sensing means, it is essential not only to intercept the undiffracted central beam before it reaches the sensing means, but also to minimize scatter, or spurious deflected rays from the main beam, to the greatest possible extent.

These difficulties are further aggravated when dealing with materials of low crystallinity, by the fact that the intensity of the diffracted ray, because of the way in which it must be produced, is necessarily very low. The relative weakness of the diffracted energy in low-angle work is illustrated by the fact that exposure times of the order of days are required to obtain a low-angle X-ray pattern compared to exposure times of hours or even minutes for wide-angle X-ray diffraction. This is mostly due to (1) the fact that very small collimator openings are required to achieve proper resolution of low-angle diffraction effects, and (2) the long path that must be provided in order to provide the same adequate resolution.

In the apparatus of this invention, as in most low-angle X-ray diffraction cameras, the preferred slit width of the defining aperture is approximately 0.002 inch, whereas the slit widths used in wide-angle work are of the order of 0.04 inch. The small area of the slit leads to a need for greater intensity energy output per unit area from the X-ray generator, which in turn has led to the development of the microfocus X-ray tube, the rotating anode X-ray tube and the like. Even using specialized generators such as these, it is difficult to provide an incident beam of such intensity that the diffracted rays will record a useable pattern in a reasonable length of time.

The second factor of prime import is the fact, that because the diffraction angle is so small, a long camera is required to achieve adequate resolution (i.e. adequate separation of lines and of orders) and the intensity of the diffracted energy reaching the sensing means is thereby greatly diminished. Thus, by way of comparison, in a typical measurement of the X-ray diffraction of a highly crystalline substance such as sodium chloride, the first-order maximum diffracted ray is not only strong to begin with, but is separated from the central beam by 31.5 degrees ($2\theta$, copper radiation), so that an adequate separation of the diffracted ray from the main beam is achieved within a very short distance. By contrast, when measuring the diffraction properties of a material of low crystallinity, for example collagen, it is found that the first-order maximum is angularly deflected from the direction of the main beam my only 0.10 degree ($2\theta$, copper radiation), and thus requires a long path to achieve sufficient separation for accurate measurement.

In recent years, considerable work has been done and a number of proposals made, in the effort to overcome the difficulties inherent in the measurement of the X-ray diffraction properties of materials of low crystallinity. One approach, which has gained universal acceptance, is to use a collimating system designed to minimize scatter taking place in the area of the system preceding the impingement of the X-ray beam on the sample. According to this approach, the collimating system consists of three slits, rather than two; in addition to the usual front aperture and defining aperture characteristic of collimated-beam instruments in general, there is a third or "guard" aperture, the function of which is to eliminate rays of spurious direction (i.e. the ones not parallel to the main beam, caused by diffraction at the defining aperture or by air-scatter between the defining aperture and the guard aperture). The guard aperture is placed in front of and rather close to the specimen. The dimensions and alignment of the guard aperture are highly critical. Any edge of the guard aperture which intercepts a portion of the main beam will diffract it, and cause its own set of "spurious" rays, while if the same edge is too far from the edge of the main beam, it will be ineffective to intercept the spurious rays produced by diffraction at the defining aperture.

The positioning of the three apertures along the length of the beam path is also an important consideration. If the defining aperture is too close to the front aperture, the resolving power of the camera is decreased, because the collimating function is less effective when the collimating slits are too close together. On the other hand, if the defining aperture is too far from the front aperture, the intensity of the central beam reaching the specimen is decreased. Adequate intensity is essential to recording data in a reasonable time.

Similarly, if the guard aperture is too close behind the defining aperture, it will be less effective to eliminate the spurious diffracted rays produced by the edges of the defining aperture, and the slit width and position adjustments become even more highly critical—to the point of impracticability—because the diffracted rays lie in such close proximity to the collimated central beam. On the other hand, if the guard aperture is too far from the defining aperture, it will unnecessarily increase the camera length, thereby decreasing beam intensity at the sensing means and increasing the required exposure time without producing a corresponding advantage.

The above precautions serve to eliminate unwanted incident rays, which otherwise would impinge on the specimen in directions other than parallel to the main beam, and the elimination of these unwanted rays ensures, so far as possible, that in the region following the specimen, all rays not in the main beam are produced by diffraction in the sample from the desired type of incident rays, i.e. those parallel to the main beam.

In the portion of the path lying between the specimen and the sensing means, there still remains a problem, in the fact that the main beam is very intense as compared to the diffracted rays under observation, and would mask the desired observation by obscuring the desired rays, for example by halation in the photographic film or background scattering in the case of a counter. This portion of the problem, however, is relatively simply solved by interposing a "beam-stop" in the path of the beam, and so positioning it that, while intercepting the main beam, it is bypassed by the first-order diffracted rays of the pattern under observation.

The positioning of the specimen holder with respect to the defining aperture and the sensing element must be optimum in order to achieve the greatest resolving power. This is the most important positioning involved in the construction of the camera. If the sample is located too near the defining aperture and too far from the sensing element, the intensity of the diffracted rays will be diminished by the long path to the sensing element, whereas if it is located too far from the defining aperture and too close to the sensing element, the resolution will be adversely affected by the fact that the path from sample to sensing element will be too short to provide adequate separation of lines, in view of the small angles involved.

As to the positioning of the guard aperture along the axis of the camera, as noted above, it should be neither too close to nor too far from the defining aperture, for maximum effectiveness in elimination of spurious rays without undue increase in camera length. In practice, the position of the specimen holder is a determining factor; when the optimum position for the specimen holder is determined, the guard aperture is located as far back toward the specimen holder as practical. In some cameras, the sample is mounted directly on the guard slit. This technique would be dangerous as applied to the camera of this invention, however, because frequent handling, in the course of changing samples, would tend to disturb the critical setting of the guard aperture. It is therefore preferred to provide separate mountings for the guard aperture and the specimen holder, the speecimen holder being located at the optimum point for best resolution, and the guard aperture being located in front of and as close to it as the mechanical construction of the mountings will conveniently permit.

The position of the beam-stop is optional to some degree. However, if it is located too close to the specimen, it will intercept not only the main beam, but also some or all of the desired diffracted rays, whereas if it is too close to the sensing means it will intercept too small an area of the intense central beam and allow the latter to "black out" the desired diffracted rays to the film or counter.

The optimum position of the sensing means, as implied above, is determined by a balance between resolving power and adequate intensity; if the sensing means is too close to the specimen, the resolution is decreased, whereas if it is too far away, the intensity of the scattered radiation is diminished. Also, there is a practical limit as to how long the camera can be made and still be conveniently mounted on a commercial X-ray generator.

The optimum positioning of the various apertures, the specimen, the beam-stop and the sensing means, and the optimum dimensions of the various apertures have been worked out mathematically and are to be found in the published literature. See, for example, O. E. Boulduan and R. S. Bear, Journal of Applied Physics, 20, 983 (1949), A. Guinier, G. Fournet, G. B. Walker and K. C. Yudowitch, "Small Angle Scattering of X-rays," J. Wiley & Sons, N.Y. (1955), and C. R. Worthington, Journal of Scientific Instruments, 33, 66 (1955).

Although the above theoretical considerations are well known to the art, there has not to date been a camera available that embodied them in physical form in the most convenient and efficient manner. Those cameras that have been proposed to date have in general suffered from the disadvantage that it was necessary to adjust the alignment of the apertures frequently, and sometimes even to make corrections in the alignment periodically during the course of an exposure. Such alignment is conventionally carried out by tedious and time-consuming X-ray techniques, and has resulted in substantial loss both of instrument time and of the time of the experimenter. Also, such cameras were commonly so constructed that a portion of the X-ray path was through the atmosphere. This contributed to undesirable air-scattering effects and also necessitated the use of beryllium windows or the like to isolate the vacuum portion of the X-ray path from the atmospheric portion. In addition, the mounting of samples in the specimen holders of many of such cameras, as well as the mounting of the specimen holders in the cameras, was somewhat tedious and time-consuming. Moreover, such instruments as have heretofore been proposed have in general been of very complicated construction, which not only added to their cost, but also required a high degree of skill on the part of the operator.

It is an object of the present invention, therefore, to provide an improved X-ray diffraction camera. Another object is to provide an improved X-ray diffraction camera particularly suitable for study of low-angle X-ray diffraction effects exhibited by materials of low crystallinity. Still another object is to provide such a camera in which the alignment of the apertures is preset and need not be continually re-adjusted. Another object still is to provide an improved method for the alignment of an X-ray diffraction camera. A further object is to provide a low-angle X-ray diffraction camera in which the X-ray path is entirely through a vacuum. A still further object is to provide a camera which eliminates the necessity of using beryllium windows. Yet another object is to provide a camera having provision for rapid and accurate sample mounting and positioning of the mounted sample in the camera. Another object is to provide a camera of improved simplicity in design and in operation. Other objects and advantages will become apparent from the following more complete description and claims.

Broadly, this invention contemplates an apparatus for investigating electromagnetic wave energy diffraction effects comprising in combination a rigid, elongated housing, said housing comprising at least two releasably connected sections, a front aperture located at a predetermined, fixed position near one end of said housing, a defining aperture located at a second predetermined, fixed position within said housing, a guard aperture located at a third predetermined, fixed position within said housing, a removable specimen holder located at a fourth predetermined, fixed position within said housing, said fourth position being located near the point at which said two sections are releasably connected, a beam-stop located intermediate said specimen holder and the rear end of said housing, and means for sensing electromagnetic radiation, said sensing means being located near the rear end of said housing.

This invention also contemplates a method of aligning an X-ray diffraction camera, comprising in combination the steps of mounting a front aperture in said camera in the absence of any impediment to the passage of visible light through said camera, mounting in said camera a defining aperture provided with means for horizontally and vertically adjusting the position of said aperture, placing a light source in front of said front aperture, sighting through the rear of said camera, manipulating one of said adjustments, determining the two positions of said adjustment at which extinction of said light first occurs, returning said adjustment to the mid-point between said two positions, repeating the procedure for the other of said two adjustments, mounting in said camera a guard aperture provided with means for horizontally and vertically adjusting the position thereof, and repeating the adjustment procedure on the guard aperture in the same manner as above recited for the defining aperture.

Referring now to the figures:

FIG. 1 is a side view of the camera according to this invention.

FIG. 2 is a longitudinal cross-section of the camera of FIG. 1.

FIG. 3 is an exploded view of one of the apertures used in the camera, with its associated mount embodying vertical and horizontal adjustments.

FIG. 4 is an exploded view of the specimen holder and its mount.

FIG. 5 is a view of the beam-stop with its mount and vertical adjustment.

As depicted in the drawings, the camera of the present invention comprises an elongated housing 1, which, in the preferred construction illustrated, is made up of a number of tubular sections arranged in end-to-end relationship. The front end, which is the narrow section to the left in the drawing, is placed in facing relationship to a suitable X-ray generator, such as a micro-focus or rotating anode X-ray tube (not shown). The front end of the camera is closed by any suitable closure which is transparent to X-rays of the wavelength being used, preferably a sheet of nickel foil 2. The use of nickel foil as the front-end seal, besides maintaining the vacuum against leakage of air through the front aperture, serves an additional useful purpose by filtering out unwanted radiation wavelengths.

The front aperture 3 is fixed and need not be adjustable, as the rest of the camera is aligned to it. It is merely a sheet of lead foil mounted across the mouth of the front end of the housing, and provided with a slit of the required dimensions, generally about 0.002 inch wide and about .045 inch long.

Each of the two remaining apertures, namely the defining aperture and the guard aperture, is of similar construction, as illustrated in FIG. 3. The actual aperture is defined by two cooperating portions—a vertically-slit lead foil 4 (or a pair of foils with opposed, spaced, vertical edges), to define the horizontal extent of the aperture, and a horizontally-slit lead foil 5, or a pair of lead foils with opposed, spaced, horizontal edges, to define the vertical limits of the aperture. In the preferred construction, the vertical edges are relatively widely spaced, and the horizontal edges relatively closely spaced, so that the X-ray beam passing through the aperture is a flat, horizontal band.

Each of the two elements of the aperture proper is mounted in an adjustable mount. The portion having the vertical edges is mounted in a small block 6 which is free to slide horizontally in a channel provided in a fixed mount 7 located in the camera housing, and is provided with a horizontal adjusting screw 8 to fix its position in the channel. By manipulation of the adjusting screw, the block is caused to move horizontally in its channel, and the horizontal position of the aperture thereby adjusted. Similarly, the portion of the aperture which contains the horizontal edges is mounted in a block 9, which in turn is free to slide vertically in a channel provided in another fixed mount 10, and is provided with a vertical adjusting screw 11.

The defining aperture and the guard aperture are both of the construction just described, differing essentially in the sizes of the respective apertures. Preferably, the guard aperture is also provided with a fine adjustment, for example worm-gear drives for turning the two adjusting screws, to facilitate the precise positioning necessary to align this aperture properly.

The specimen holder employed in the camera of this invention is preferably of the construction shown in FIG. 4. In FIG. 4, a mount, permanently located in the camera housing, is indicated generally at 12. The rear face of the mount is provided with a groove 13 to receive an O-ring, which is used in the illustrated form of camera to provide a vacuum-tight seal between the sections. The mount is also provided with a pin 14 to assist in orienting the sample holder properly in its mount, and is centrally bored, as indicated at 15, to pass the X-ray beam and to receive the projecting portions of the sample holder. The sample holder is indicated generally at 16, and is in the form of a disc provided with a shoulder 17 of a size to fit snugly in the central bore 15 of the mount.

Centrally located on the sample holder is a boss 19, which is centrally bored to permit passage of the X-ray beam. The boss is also traversed by a diametrical V-shaped groove 20 of a size to receive a thread-or hair-like sample and cause it to lie across the center of the bore. Sample holder cover 21, similarly centrally bored, is provided with a diametrical rib 22, of a size to fit into groove 20 and force a sample into the bottom thereof. The sample holder is also provided with a recess 18 to receive pin 14, thereby fixing the rotational orientation of the sample holder in the mount.

The apparatus is also provided with means, such as spring clips, screws or the like, for holding the various parts in their assembled relationship, these parts being omitted from FIG. 4 for purposes of clarity.

FIG. 5 illustrates the preferred construction of the beam-stop. The beam-stop proper 23 is a thin elongated member made of lead mounted on a block 24, which is capable of limited vertical motion in a channel provided for the purpose in mount 25, which in turn is fixedly positioned in the camera housing. Block 24 is provided with an adjusting screw 26 by means of which its position in the channel can be adjusted. Beam-stop 23 is preferably an elongated piece of flat sheet lead, approximately $\frac{1}{16}$ inch wide and $\frac{1}{32}$ inch thick. Preferably, the face of the beam-stop that intersects the main beam is provided with a slight concave curvature.

The sensing means is conventional and is not illustrated. In the embodiment as depicted in FIGS. 1 and 2, the rear end of the camera is closed by cap 27, forming a chamber behind the beam-stop in which is placed a conventional X-ray film cassette. In an alternative arrangement, the cap is replaced by an open-ended tubular section connected in vacuum-tight fashion to other conventional X-ray detection apparatus such as a pulse-counting goniometer or the like.

The housing may if desired be a single elongated closed container. For convenience in assembly, alignment, and the insertion and removal of samples, however, it is preferred that the housing be constructed of at least two and preferably more tubular sections in end-to-end relationship, the sections being separably joined at points along the camera axis which provide ready access to the apertures and, especially, to the sample holder. As illustrated in FIG. 2, the housing comprises a front tubular section 28 joined to a second tubular section 29, the junction being in the neighborhood of the location of defining aperture 30. The two sections are joined by screws 31 and sealed by O-ring 32 as shown. The rear end of section 29 serves as the mounting point for guard aperture 33, and is connected to a short tubular section 12 which receives specimen holder 16 as shown in FIG.4, thus serving a twofold function, namely, as specimen holder mount and as part of the housing itself. This short section 12 is spaced a convenient distance—say 2–3 inches—from rear section 35, and is separably connected thereto by a coupling 36. Coupling 36 is released by backing it off whenever it is desired to change samples, and the clearance between section 12 and section 35 provides room for access to the sample holder. The beam-stop mount 25 is located near the rear end of section 35, and the end of section 35 is either closed by cap 27 as illustrated or connected by a suitable vacuum-tight connection to a pulse-counter or the like, as already described.

At least one and preferably two or more of the sections are provided with means for evacuating the system, indicated by vacuum hose connections 37. The use of more than one hose connection as shown is advantageous in that it speeds pumping down by minizing the required amount of diffusion through the apertures.

The whole assembly is mounted by means of suitable supporting structures indicated by brackets 38 on a suitable rigid base indicated by bed member 39.

In performing the necessary alignment of the various parts of the camera prior to use, the nickel foil filter is removed so that the front aperture is exposed. A light source, preferably a small one approximately a point source, is placed in front of the front aperture, and the defining aperture is assembled in position. By means of the adjusting screws above described, the position of the aperture is manipulated through the entire horizontal range from extinction through maximum brightness to extinction, as observed visually through the back of the camera. The two positions of extinction are noted, in terms of turns of the adjusting screw from one extinction point to the other. The screw is then backed off by half the observed number of turns, leaving the horizontal adjustment at the mid-point between the two extinction positions. The same procedure is then carried out with the vertical adjustment. Next, the guard aperture is mounted in place, and the same two-step procedure is carried out on it. Finally, the beam-stop is assembled in place and a similar procedure carried out with it, except that there is only one adjustment (the vertical). The adjustment of the beam-stop is the last step in aligning the camera, and is preferably done just before it is used. In adjusting the beam-stop, it is more convenient and precise to use an electron counter method, rather than a light beam observation. An electron detector, for example a Geiger counter is positioned behind the beam-stop, and a background count is taken. The X-ray beam is then turned on, and the beam-stop is adjusted until the count is equal to the background count, indicating that the X-ray beam is completely intercepted by the beam-stop.

Once aligned in this manner, the camera, because of its unique construction, will retain its alignment indefinitely unless upset by mechanical shock or the like. Repeated removal and replacement of samples does not change the alignment of the camera, in the normal course of events.

The present invention provides an improved X-ray diffraction camera for study of low-angle diffraction effects. It eliminates the need for frequent adjustment and realignment between or during exposures, and provides greatly improved convenience, ease and efficiency of operation.

While this invention has been described in terms of certain preferred embodiments and illustrated by way of certain drawings, these are illustrative only, and the invention is not to be construed as limited, except as set forth in the appended claims.

We claim:

1. A low-angle X-ray diffraction camera comprising in combination a rigid, elongated housing, said housing comprising at least two releasably connected sections, a front aperture located at a predetermined, fixed position near one end of said housing, a defining aperture located at a second predetermined, fixed position within said housing, a guard aperture located at a third predetermined, fixed position within said housing, said apertures cooperating to eliminate X-rays entering said front aperture except for a thin, flat band of substantially parallel X-rays, a removable specimen holder located at a fourth predetermined, fixed position within said housing, said fourth position being located near the point at which said two sections are releasably connected, said third position and said fourth position being so related as to place said specimen holder in close proximity to said guard aperture but spaced therefrom, a beam-stop located intermediate said specimen holder and the rear end of said housing, said beam-stop being an elongated member of X-ray opaque material disposed with its elongated dimension parallel with the width of said flat band of X-rays and in position to intercept the same, said beam-stop being mounted on a block and being capable of limited vertical motion in a channel member provided for the same in a mount, said mount being fixedly positioned in said housing, said block being provided with adjusting means for adjusting its position in said channel, and a face of said beam-stop that intercepts said band of X-rays being of a generally slightly concave curvature and X-ray sensing means, said sensing means being located near the rear end of said housing.

2. Apparatus according to claim 1, wherein said housing is vacuum-tight when connected, and is provided with means for evacuation thereof.

3. Apparatus according to claim 1, wherein each of said apertures is provided with means for horizontally and vertically adjusting the position of said aperture with respect to the longitudinal axis of said hosuing.

4. Apparatus according to claim 1, wherein said specimen holder comprises a block and a cover, one of said block and said cover having a groove adapted to receive a filamentary specimen, and the other of said block and said cover having a rib adapted to force said specimen into the bottom of said groove.

5. Apparatus according to claim 1, wherein said specimen holder comprises a flat surface and a protruding boss, and said housing contains a member having a flat surface and a recess for snugly receiving said boss.

6. Apparatus according to claim 1, wherein said elongated housing comprises a plurality of separable sections of predetermined length, and said apertures are located in proximity to the junction points between adjacent sections.

References Cited

UNITED STATES PATENTS

| | | | |
|---|---|---|---|
| 2,317,329 | 4/1943 | McLachlan | 250—51.5 |
| 2,753,458 | 7/1956 | Kazato et al. | 250—49.5 |
| 2,831,977 | 4/1958 | Henke | 250—51.5 |
| 3,102,194 | 8/1963 | Van Den Broek et al. | 250—49.5 |
| 3,171,957 | 3/1965 | Coleman et al | 250—49.5 |
| 3,191,028 | 6/1065 | Crewe | 250—49.5 |
| 3,248,542 | 4/1966 | Nixon | 250—49.5 |
| 3,248,547 | 4/1966 | Van de Geijn | 250—86 |

OTHER REFERENCES

"Philips Technical Review," vol. 10, No. 157, Parrish and Cisney, 1948, pp. 157–167.

RALPH G. NILSON, *Primary Examiner.*

A. L. BIRCH, *Assistant Examiner.*